United States Patent
Amirsolaimani et al.

(10) Patent No.: US 10,996,466 B2
(45) Date of Patent: May 4, 2021

(54) WAVEPLATES ON A CURVED SURFACE AND FABRICATION METHOD THEREOF

(71) Applicant: Facebook Technologies, LLC, Menlo Park, CA (US)

(72) Inventors: Babak Amirsolaimani, Menlo Park, CA (US); Ying Geng, Menlo Park, CA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 172 days.

(21) Appl. No.: 16/268,477

(22) Filed: Feb. 5, 2019

(65) Prior Publication Data

US 2020/0249475 A1 Aug. 6, 2020

(51) Int. Cl.
 G02B 27/00 (2006.01)
 G02B 3/04 (2006.01)
 G02B 5/30 (2006.01)

(52) U.S. Cl.
 CPC .......... G02B 27/0081 (2013.01); G02B 3/04 (2013.01); G02B 5/3016 (2013.01)

(58) Field of Classification Search
 CPC .... G02B 27/0081; G02B 3/04; G02B 5/3083; G02B 2027/0123; G02B 27/0172
 See application file for complete search history.

(56) References Cited

U.S. PATENT DOCUMENTS

| | | | |
|---|---|---|---|
| 10,197,715 B1* | 2/2019 | Tabirian | B29D 11/00769 |
| 2008/0049184 A1 | 2/2008 | Tan et al. | |
| 2017/0045760 A1 | 2/2017 | Tabirian et al. | |
| 2017/0097508 A1 | 4/2017 | Yun et al. | |
| 2017/0168302 A1 | 6/2017 | McDowall et al. | |
| 2018/0356704 A1* | 12/2018 | Tabirian | A61F 2/1627 |

FOREIGN PATENT DOCUMENTS

WO 2014/151877 A1 9/2014

OTHER PUBLICATIONS

International Search Report and Written Opinion dated Nov. 5, 2019, in International Application No. PCT/US2019/016880, filed on Feb. 6, 2019 (14 pages).

* cited by examiner

Primary Examiner — Robert E. Tallman
(74) Attorney, Agent, or Firm — Millburn IP PLLC

(57) ABSTRACT

An optical film fabrication method, an optical film and a head-mounted display are provided. The optical film fabrication method comprises: providing a substrate having a curved surface; dispensing a photo-alignment (PAM) layer on the curved surface of the substrate and exposing the PAM layer to spatially-uniformly polarized light; dispensing a birefringent material layer on the PAM layer; and curing the birefringent material layer to form a birefringent film on the curved surface. An optic axis orientation of birefringent material molecules in the birefringent film are spatially uniform across the birefringent film.

19 Claims, 11 Drawing Sheets

US 10,996,466 B2

WAVEPLATES ON A CURVED SURFACE AND FABRICATION METHOD THEREOF

BACKGROUND

The present disclosure generally relates to head-mounted displays (HMDs) and, more particularly, relates to a method to fabricate waveplates on a curved surface and curved waveplates thereof to increase the freedom of lens design in HMDs.

Currently, head-mounted displays (HMD) for virtual-reality (VR) and/or augmented-reality (AR) and/or mixed-reality (MR) applications have design criteria to be compact and light weight, and have high resolution, large field of view (FOV), and small form factors. An HMD generally have a display element that generates image light that directly passes through a lens system to reach a user's eyes. The lens system includes multiple optical elements, such as lenses, waveplates, reflectors, etc., for focusing the image light to the user's eyes, among which waveplates such as quarter-waveplate or half-waveplates are often used as polarization management components in the lens system.

To produce a large FOV, optical elements in the lens system often require high optical curvature. However, traditional waveplates are often flat, and using such waveplates on the optical elements of high curvature is rather difficult due to challenges of laminating a flat film on a curved surface. The disclosed fabrication method and waveplates thereof are directed to solve one or more problems set forth above and other problems.

BRIEF SUMMARY OF THE DISCLOSURE

One aspect of the present disclosure provides an optical film fabrication method. The optical film fabrication method comprises: providing a substrate having a curved surface; dispensing a photo-alignment (PAM) layer on the curved surface of the substrate and exposing the PAM layer to spatially-uniformly polarized light; dispensing a birefringent material layer on the PAM layer; and curing the birefringent material layer to form a birefringent film on the curved surface. An optic axis orientation of birefringent material molecules in the birefringent film are spatially uniform across the birefringent film.

Another aspect of the present disclosure provides an optical film. The optical film comprises a birefringent film attachable to a curved surface of a substrate, an optic axis orientation of birefringent material molecules in the birefringent film being spatially uniform across the birefringent film.

Another aspect of the present disclosure provides a head-mounted display (HMD). The HMD comprises an electronic display configured to generate image light; and a pancake lens block. The pancake lens block comprises a back curved optical element that alters the image light, the back curved optical element including a first surface configured to receive the image light and an opposing second surface configured to output altered image light; and a front curved optical element coupled to the back curved optical element that to further alter the altered image light, the front curved optical element including a first surface and a second surface. A first portion of the altered image light is reflected by a surface of the front curved optical element towards the back curved optical element. A surface of the back curved optical element reflects the first portion of the altered image light back to the front curved optical element for transmission to an exit pupil of the HMD. At least one curved surface of the back curved optical element and the front curved optical element is attached with an optical film comprising a birefringent film, an optic axis orientation of birefringent material molecules in the birefringent film being spatially uniform across the birefringent film.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
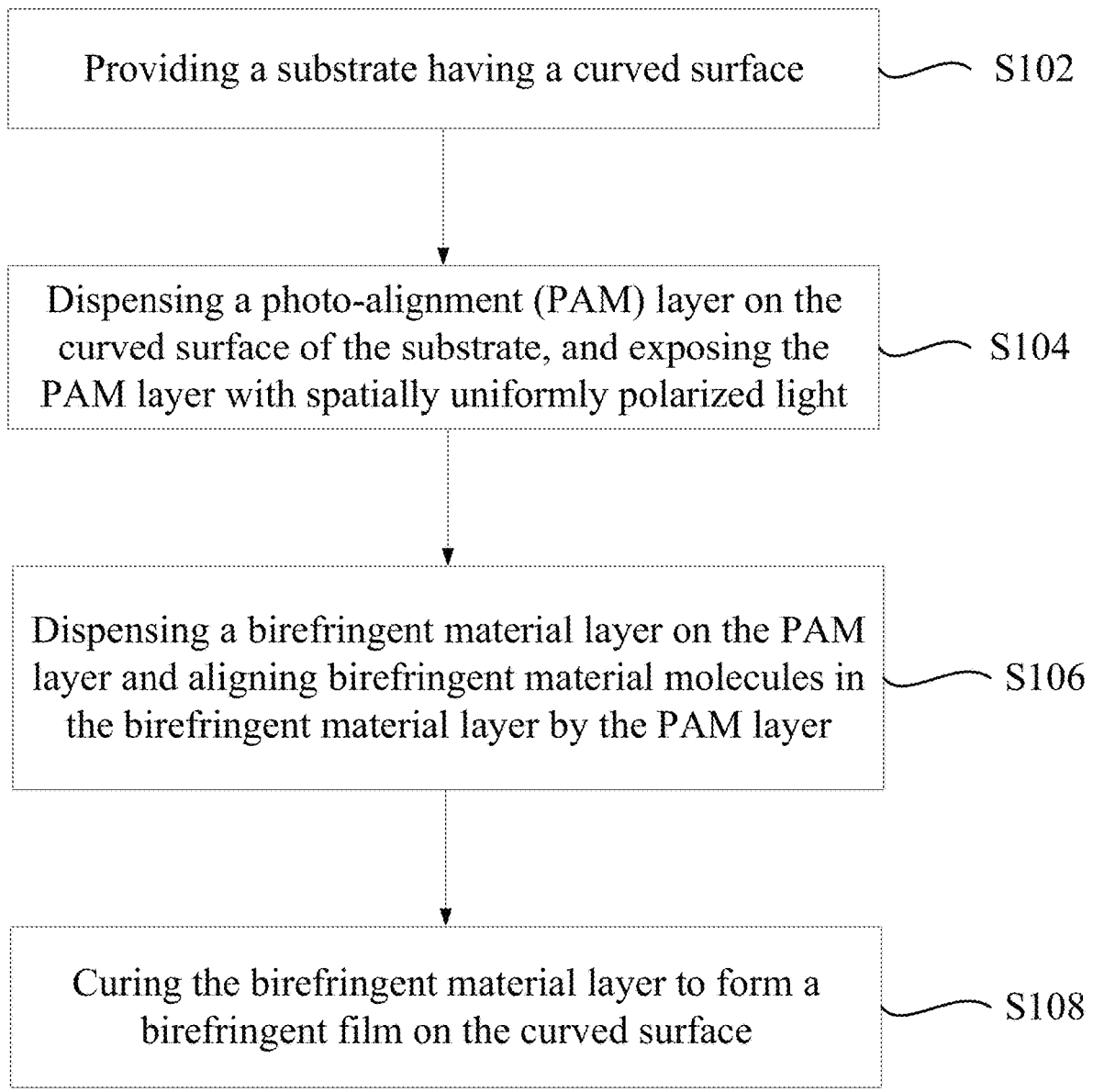
FIG. 1 illustrates a flowchart of an example process for fabricating a liquid crystal (LC) waveplate on a curved surface consistent with the disclosed embodiments.

Reference will now be made in detail to exemplary embodiments of the disclosure, which are illustrated in the accompanying drawings. Hereinafter, embodiments consistent with the disclosure will be described with reference to drawings. In the drawings, the shape and size may be exaggerated, distorted, or simplified for clarity. Wherever possible, the same reference numbers will be used throughout the drawings to refer to the same or like parts, and a detailed description thereof may be omitted.

Further, in the present disclosure, the disclosed embodiments and the features of the disclosed embodiments may be combined under conditions without conflicts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

The present disclosure provides a method to fabricate liquid crystal (LC) waveplates on a curved surface and LC waveplates thereof, which may provide a new degree of freedom in lens design in AR/VR/MR HMDs, thereby facilitating complex imaging functions and achieving a small form factor, a large FOV, and/or a large eye-box in AR/VR/MR HMDs.

FIG. 1 illustrates a flowchart of an example process for fabricating a liquid crystal (LC) waveplate on a curved surface consistent with the disclosed embodiments. FIGS. 2A-2E illustrate cross-sectional views of an example LC waveplate during certain stages of the process in FIG. 1 consistent with disclosed embodiments.

Figure 2A:
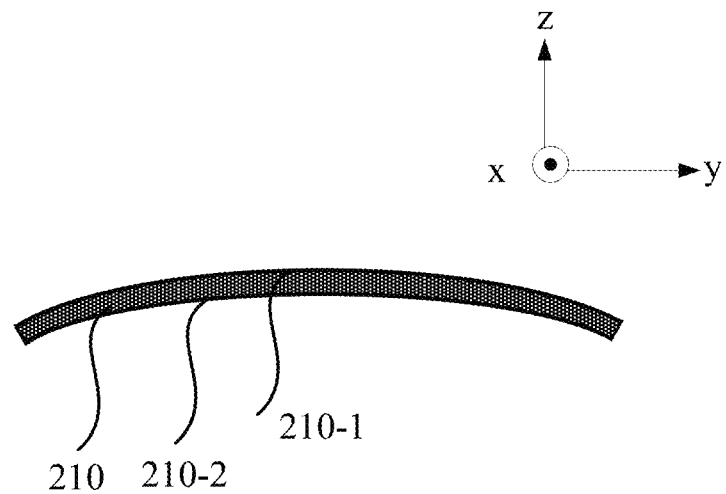
FIGS. 2A-2F illustrate cross-sectional views of an example LC waveplate during certain stages of the process in FIG. 1 consistent with disclosed embodiments.

As shown in FIG. 1, at the beginning, a substrate having a curved surface is provided (S102). A corresponding structure is shown in FIG. 2A. As shown in FIG. 2A, a substrate 210 having a curved surface may be provided, in which the curved surface may be any appropriate curved surfaces, such as a convex surface, a concave surface, or an aspherical surface, etc. In certain embodiments, the substrate 210 may be silicon, silicon dioxide, sapphire, plastic, polymer or some other semiconductor that is substantially transparent in the visible band (~380 nm to 750 nm). In certain embodiments, the substrate 210 may also be transparent in some or all of the infrared (IR) band (~750 nm to 1 mm). In certain embodiments, the substrate 210 may also be a flexible substrate, such as polyethylene terephthalate (PET), polyethylene naphthalate (PEN) or any appropriate flexible substrates. In certain embodiments, the substrate 210 may be an optical element, for example, a convex lens, a concave lens, a plano-convex, a plano-concave lens, etc.

For illustrative purposes, in FIG. 2A, the substrate 210 may have a first surface 210-1 and a second surface 210-2 arranged opposite to each other, each of which may be a curved surface having a same radius of curvature. In certain embodiments, the two curved surfaces of the substrate 210 may have different radius of curvature. In certain embodiments, the substrate 210 may only have one curved surface, while the opposite surface may be a planar surface or a surface having any appropriate shapes.

Returning to FIG. 1, after the substrate having the curved surface is provided, a photo-alignment (PAM) layer is dispensed on the curved surface of the substrate, then exposed with spatially-uniformly polarized light (S104). A corresponding structure is shown in FIG. 2B.

Figure 2B:
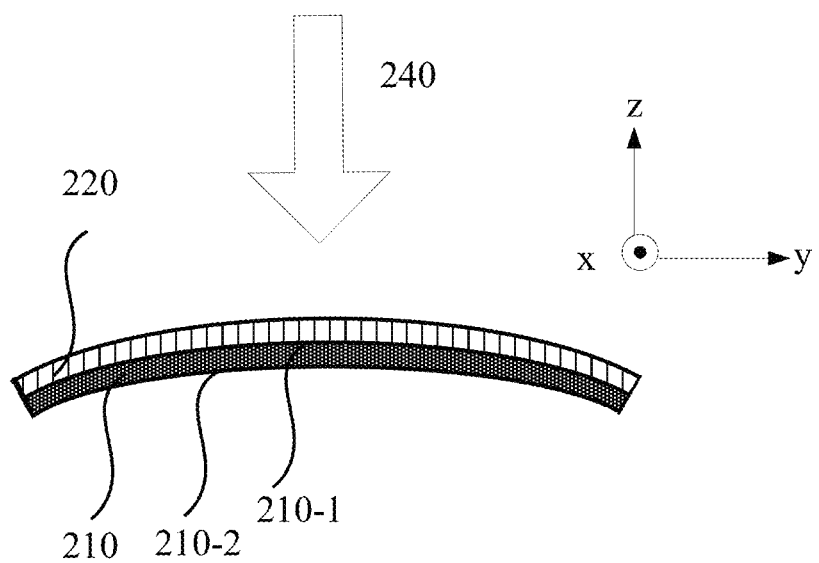

As shown in FIG. 2B, a photo-alignment (PAM) layer 220 may be dispensed, for example, spin coated, on the curved surface 210-1 of the substrate 210 and exposed with spatially-uniformly polarized light 240. The PAM layer 220 may have a same radius of curvature as the curved surface 210-1 of the substrate 210. In particular, the PAM layer 220 may be capable of producing an internal structure aligned according to polarized light irradiation. In certain embodiments, the PAM layer 220 may be made of photosensitive materials capable of being aligned under polarized light irradiation.

The spatially-uniformly polarized light 240 may be the light having spatially uniform distribution of a certain polarization state. For example, a light source may emit unpolarized light (e.g., unpolarized ultraviolet, violet or blue light) with the wavelength in the absorption band of the photosensitive materials, and polarization control optics comprising a polarization converter may receive the unpolarized light and output light with spatially-uniform distribution of linear polarization. The light with spatially uniform distribution of linear polarization is referred as uniformly linearly polarized light for short in the following description.

After subjected to sufficient exposure of uniformly linearly polarized light with the wavelength in the absorption band of the photosensitive materials, the photosensitive material molecules in the PAM layer 220 may be uniformly aligned along the polarization direction of the uniformly linearly polarized light 240. That is, the alignment direction or orientation of the photosensitive material molecules may be uniform across the entire PAM layer 220. The PAM layer 220 which has been uniformly aligned is referred as a PAM film.

For example, referring to FIG. 2B, given the polarization direction of the uniformly linearly polarized light 240 is along the y-axis, then the alignment direction or orientation of the photosensitive material molecules in the PAM layer 220 (i.e., the alignment direction of the PAM layer 220) may also be along the y-axis. In certain embodiments, the thickness of the PAM layer 220 may be approximately 3-100 nm.

Returning to FIG. 1, after the PAM layer is dispensed on the curved substrate and exposed with uniformly polarized light, a birefringent material layer is dispensed on the PAM layer which has been uniformly aligned, and birefringent material molecules in the birefringent material layer are aligned by the uniformly aligned PAM layer to create a waveplate structure in which an optic axis orientation of the birefringent material molecules are spatially uniform across the entire birefringent material layer (S106). A corresponding structure is shown in FIG. 2C.

Figure 2C:
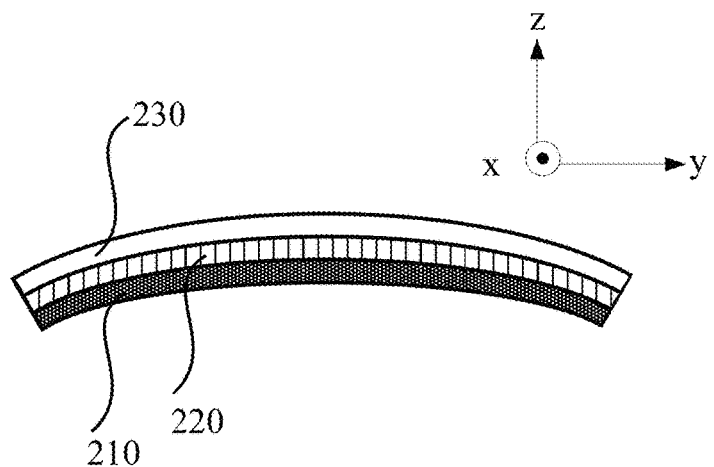

As shown in FIG. 2C, the PAM layer 220 may have a first surface facing the substrate 210 and a second opposing surface far away from the substrate 210, and a birefringent material layer 230 may be dispensed, for example, spin coated, on the second surface of the PAM layer 220. The birefringent material layer 230 may have a same radius of curvature as the curved surface 210-1 of the substrate 210 and the PAM layer 220.

The birefringent material layer 230 may include polymerizable liquid crystal precursors. In certain embodiments, the polymerizable liquid crystal precursors may include mixed LC materials and polymerizable monomers. In certain embodiments, the polymerizable liquid crystal precursors may include reactive mesogens which are polymerizable molecules with similar optical properties to LC materials. Molecules of the LC materials and reactive mesogens are referred as birefringent material molecules.

In addition, the polymerizable liquid crystal precursors may also include photo-initiators which create reactive species when exposed to, for example, UV radiation. The LC materials may include nematic LCs, twist-bend LCs, or chiral nematic LCs (or LCs with chiral dopant), etc. The chiral nematic LCs (or LCs with chiral dopant) may enable a dual-twist or multiple-twist structure of the birefringent material layer 230. The LC materials in the birefringent material layer 230 may have positive or negative dielectric anisotropy.

Figure 2D:
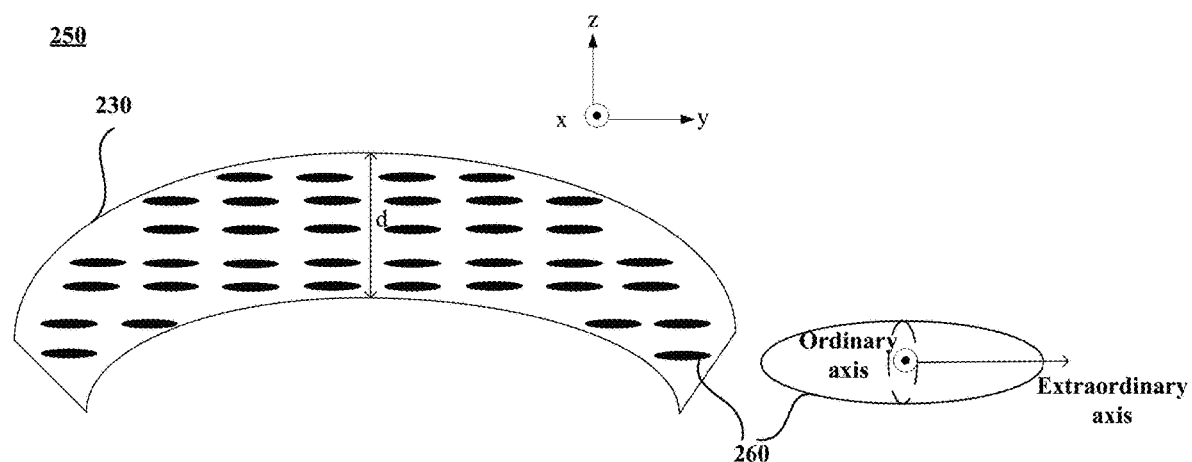

Due to anisotropic interfacial interaction, the PAM layer 220 which has been uniformly aligned may enable the birefringent material molecules in the birefringent material layer 230 to have a spatially uniform optic axis orientation (i.e., alignment direction) across the entire birefringent material layer 230, such that a waveplate structure may be generated in the birefringent material layer 230. FIG. 2D illustrates an example optic axis orientation 250 of LC molecules 260 in the birefringent material layer 230 in FIG. 2C consistent with the disclosed embodiments. As shown in FIG. 2D, the LC materials may have positive or negative dielectric anisotropy, and the optic axes of LC molecules 260 may have a uniform homogeneous orientation in the y-axis across the entire birefringent material layer 230. Such a waveplate structure may be realized by aligning the LC molecules 260 on the PAM layer which has been uniformly homogeneously aligned in the y-axis.

Further, as shown in FIG. 2D, each LC molecule 260 may have a rod shape having an ordinary axis with index of refraction $n_o$ and an extraordinary axis with index of refraction $n_e$. The ordinary axis is perpendicular to the optic axis of the LC molecule 260, and the extraordinary axis is parallel to the optic axis of the LC molecule 260. For example, in FIG. 2D, the extraordinary axis and the optic axis of the LC molecule 260 are both along the y-axis, while the ordinary axis of the LC molecule 260 is along the x-axis.

For light normally incident onto the birefringent material layer 230, the polarization component along the ordinary axis travels through the birefringent material layer 230 with a speed $v_o=c/n_o$ while the polarization component along the extraordinary axis travels with a speed $v_e=c/n_e$, which leads to a phase difference between the two components as they exit the birefringent material layer 230. The extraordinary axis is called the slow axis and the ordinary axis is called the fast axis when $n_e>n_o$.

Depending on the phase difference between the two components as they exit the birefringent material layer 230, light with polarization components along the ordinary axis and the extra ordinary axis will emerge into a different polarization state. The phase difference between the two components as they exit the birefringent material layer 230 is related to the birefringence Δn of the LC material and the thickness d of the birefringent material layer 230 by the following formula:

$$\varphi = \frac{2\pi \Delta n d}{\lambda_0}$$

where $\lambda_0$ is the vacuum wavelength of the light, and the birefringence $\Delta n = n_e - n_o$.

Thus, through changing the birefringence Δn of the LC material and the thickness d of the birefringent material layer 230, various types of LC waveplates may be realized, such as quarter-waveplate (QWP), half-waveplate (HWP), etc. In particular, for the birefringent material layer 230 having a constant birefringence Δn of the LC materials, various types of LC waveplates may be realized through merely changing the thickness d of the birefringent material layer 230.

Figure 2E:
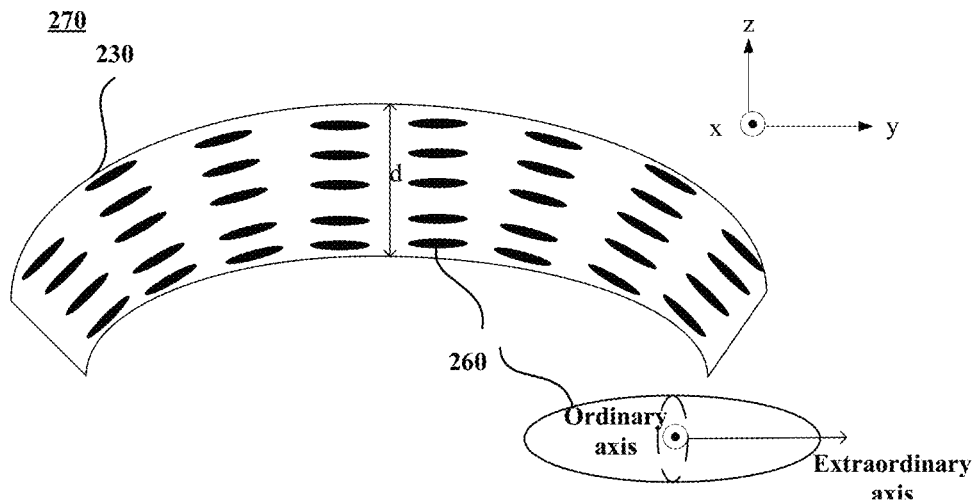

It should be noted that the optic axis orientation of the LC molecule 260 in FIG. 2D is for illustrative purposes, which is not intended to limit the scope of the present disclosure. FIG. 2E illustrates another example optic axis orientation 270 of LC molecules 260 in the birefringent material layer 230 in FIG. 2C consistent with the disclosed embodiments.

As shown in FIG. 2E, the optic axes of LC molecules 260 may be orientated to be normal to the curvature of the birefringent material layer 230, i.e., the LC molecules 260 may have an orientation normal to the curvature of the birefringent material layer 230.

Returning to FIG. 1, after the birefringent material molecules in the birefringent material layer are aligned by the spatially uniformly aligned PAM layer, the birefringent material layer is cured to form a birefringence film on the curved surface, such that the waveplate structure is stabilized onto the curved surface (S108). A corresponding structure is shown in FIG. 2F.

Figure 2F:
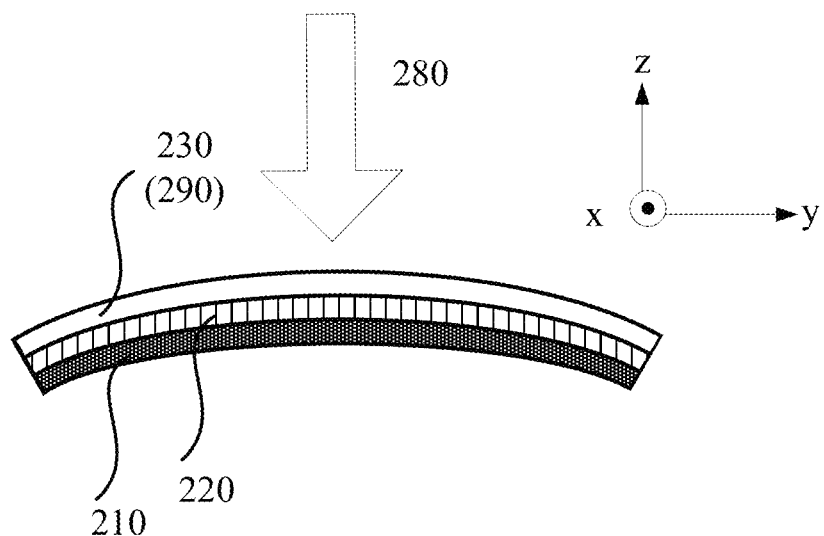

As shown in FIG. 2F the birefringent material layer 230 having the waveplate structure may be exposed to unpolarized light 280, such as unpolarized UV light. Under sufficient UV exposure, the birefringent material layer 230 may be photopolymerized to form a birefringent film, in which the uniform optic axis orientation of the birefringent material molecules is stabilized after the photopolymerization. That is, the birefringent film may also exhibit a uniform optic axis orientation of the birefringent material molecules across the entire birefringent film. Accordingly, the waveplate structure generated in the birefringent material layer 230 may be stabilized onto the curved surface of the substrate 110. The uniform optic axis orientation of the birefringent material molecules in the entire birefringent film is referred as the alignment direction of the birefringent film.

In particular, when the birefringent material layer 230 includes polymerizable LC precursors, the polymerizable LC precursors in the birefringent material layer 230 may be photopolymerized under sufficient UV exposure to form a liquid crystal polymer film, which has a uniform optic axis orientation of LC molecules across the entire liquid crystal polymer film. Thus, a stable LC waveplate 290 (or more broadly speaking, a stable LC optical film having a waveplate structure in which an optic axis orientation of LC molecules are spatially uniform across the entire optical film) may be successfully fabricated on the curved surface of the substrate 110.

For illustrative purposes, FIGS. 2A-2F merely show the fabrication process of an LC waveplate having a single liquid crystal polymer film on the curved surface. The LC waveplate having a single liquid crystal polymer film may be designated for a simple monochrome design. To realize a polarization control of the transmitted light, the LC waveplate may be oriented to have an angle of approximately 45 degrees between the polarization axis (i.e., fast axis) of the LC waveplate and the polarization direction of the linearly polarized incident light.

In certain embodiments, two or more liquid crystal polymer films may be stacked on the curved surface of the substrate to form a compound LC waveplate (or more broadly speaking, an LC optical film having a compound waveplate structure). The fabrication method of a compound LC waveplate may further include depositing a second or more liquid crystal polymer films on a first liquid crystal polymer film in same way as depositing the first liquid crystal polymer film on the curved surface of the substrate.

That is, forming the second or more liquid crystal polymer films on the curved surface may include: dispensing an (n+1)-th PAM layer on the n-th liquid crystal polymer film; exposing the (n+1)-th PAM layer to spatially-uniformly polarized light; dispensing an (n+1)-th birefringent material layer on the uniformly aligned (n+1)-th PAM layer; aligning the birefringent material molecules in the (n+1)-th birefringent material layer by the uniformly aligned (n+1)-th PAM layer to create an (n+1)-th waveplate structure; and curing the (n+1)-th birefringent material layer to form an (n+1)-th birefringent film on the curved surface, where n is a positive integer equal to or larger than 1.

In certain embodiments, the birefringent materials in the multiple birefringent material layer may have same or different material characteristics, such as a chirality sign, ordinary refractive index, extraordinarily refractive index, etc. In certain embodiments, the multiple PAM layers may be spatially uniformly aligned in same or different directions, which may be resulted by irradiating the PAM layers with uniform linearly polarized light having same or different polarization directions. Accordingly, the birefringent material layers aligned by the respective aligned PAM layers may have same or different alignment directions. That is, the optic axis orientation of the LC molecules in the respective birefringent material layers may be the same or different. Thus, after curing the birefringent material layers, the optic axis orientation of the LC molecules in the respective liquid crystal polymer films may also be the same or different. In addition, each liquid crystal polymer film in the compound LC waveplate may provide a same or different amount of birefringence in the unit of wavelength, e.g., quarter-wave birefringence, half-wave birefringence.

In certain embodiments, when the multiple liquid crystal polymer films have different alignment directions (i.e., different optic axis orientations of the LC molecules), the wavelength dependence of the phase shift induced by the multiple liquid crystal polymer films may cancel out each other. Thus, the compound LC waveplate may operate as an achromatic waveplate, which provides a nearly constant phase shift (e.g., quarter-wave birefringence, half-wave birefringence) across a wide spectral range. That is, using combination of liquid crystal polymer films with different alignment direction, achromatic LC waveplates may be realized.

Figure 3A:
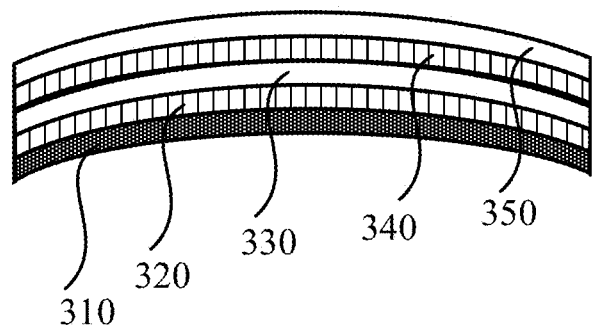
FIG. 3A illustrates another example LC waveplate fabricated on a curved surface consistent with the disclosed embodiments.

FIG. 3A illustrates an example LC waveplate 300 on a curved surface consistent with the disclosed embodiments. The LC waveplate 300 may be an achromatic waveplate. As shown in FIG. 3A, the LC waveplate 300 may include a substrate 310 having a curved surface, as well as, a first PAM film 320, a first liquid crystal polymer film 330, a second PAM film 340, and a second liquid crystal polymer film 350, which are sequentially formed on the curved surface of the substrate 310.

In certain embodiments, to configure the LC waveplate 300 as an achromatic LC quarter-waveplate, one of the first liquid crystal polymer film 330 and the second liquid crystal polymer film 350 may be configured to have half-wave birefringence, and the other may be configured to have quarter-wave birefringence. The alignment directions of the first liquid crystal polymer film 330 and the second liquid crystal polymer film 350 may be orientated relative to each other to cancel out the wavelength dependence of the phase shift induced thereby.

For example, the alignment directions of the first liquid crystal polymer film 330 and the second liquid crystal polymer film 350 may be both in the x-y plane, however, the alignment direction of the second liquid crystal polymer film 350 may be oriented to have an angle α with respective to the alignment direction of the first liquid crystal polymer film 330. Through specifically selecting the angle α and the birefringent materials in each liquid crystal polymer films, the wavelength dependence of the phase shift induced by the first liquid crystal polymer film 330 and the second liquid crystal polymer film 350 may cancel out each other, and the LC waveplate 300 may produce a quarter-wave birefringence across a desired wide spectral range.

Figure 3B:
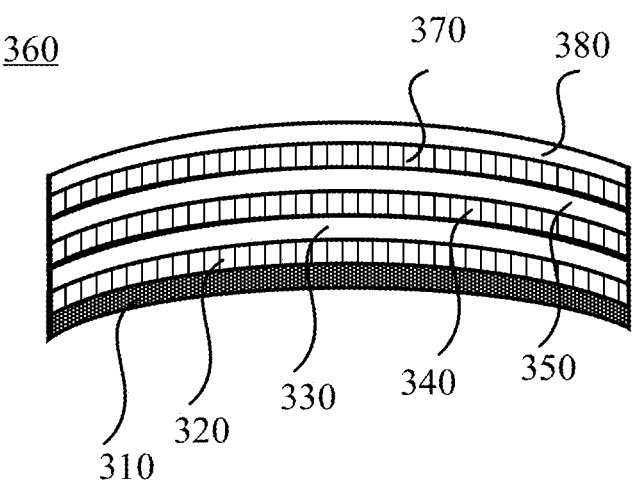
FIG. 3B illustrates another example LC waveplate fabricated on a curved surface consistent with the disclosed embodiments.

FIG. 3B illustrates another example LC waveplate 360 fabricated on a curved surface consistent with the disclosed embodiments. The LC waveplate 360 may be an achromatic waveplate. As shown in FIG. 3B, the LC waveplate 360 may include a substrate 310 having a curved surface, which is sequentially disposed with a first PAM film 320, a first liquid crystal polymer film 330, a second PAM film 340, a second liquid crystal polymer film 350, a third PAM film 370 and a third liquid crystal polymer film 380.

In certain embodiments, to configure the LC waveplate 300 as an achromatic LC quarter-waveplate, the first liquid crystal polymer film 330, the second liquid crystal polymer film and the third liquid crystal polymer film 380 each may have quarter-wave birefringence. The alignment directions of the first liquid crystal polymer film 330, the second liquid crystal polymer film 350 and the third liquid crystal polymer film 380 may be orientated relative to each other to cancel out the wavelength dependence of the phase shift induced thereby.

For example, the alignment directions of the three liquid crystal polymer films may be all in the x-y plane, however, the alignment direction of the second liquid crystal polymer film 350 may be oriented to have an angle β with respective to the alignment direction of the first liquid crystal polymer film 330, and the alignment direction of the third liquid crystal polymer film 380 may be oriented to have an angle λ with respective to the alignment direction of the first liquid crystal polymer film 330.

Thus, through specifically selecting the angle β, the angle λ, and the birefringent materials in each liquid crystal polymer film, the wavelength dependence of the phase shift induced by the three liquid crystal polymer films may cancel out each other, and the LC waveplate 360 may produce a quarter-wave birefringence across a desired wide spectral range.

The LC optical film fabricated on the curved surface may operate as a curved optical element having a predetermined optical function, i.e., a curved LC optical film having a predetermined optical function. In certain embodiments, the curved LC optical film may be used to change the phase of the transmitted light, in which the linearly polarized incident light may be configured to have its polarization axis aligned with the polarization axis (i.e., fast axis) of the LC waveplate. In this case, the curved LC optical film is an LC phase retarder.

In certain embodiments, the curved LC optical film may be used as a polarization management element. For example, a curved LC optical film having half-waveplate birefringence (e.g., an LC half-waveplate) may shift the polarization direction of linearly polarized light. A curved LC optical film having quarter-waveplate birefringence (e.g., an LC quarter-waveplate) may convert linearly polarized light into circularly polarized light and vice versa. The LC quarter-waveplate may also be used to produce elliptical polarization.

Figure 3C:
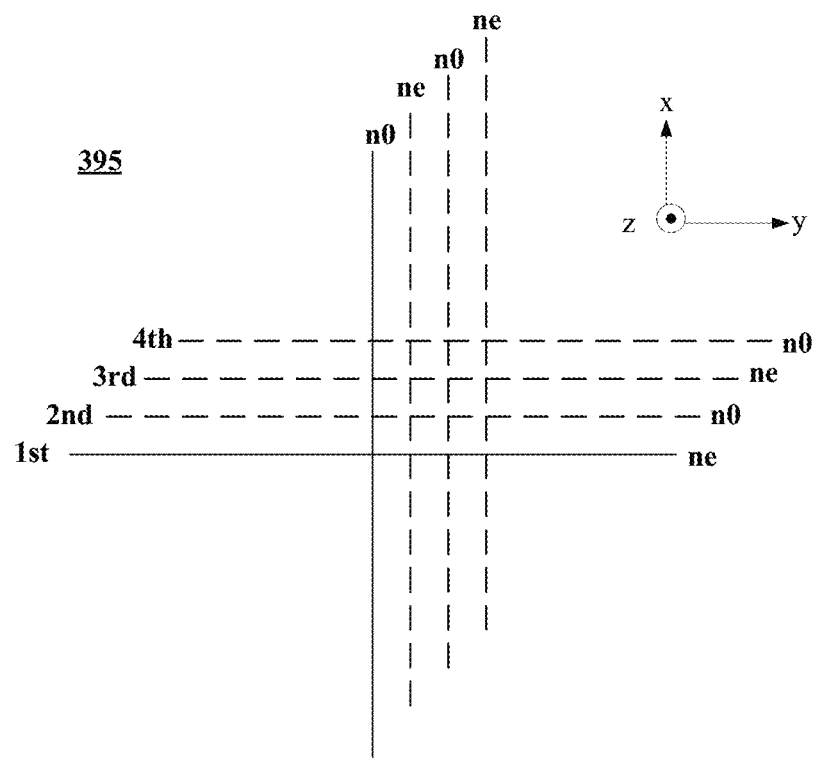
FIG. 3C illustrates example orientations of liquid crystal polymer films in another example LC waveplate fabricated on a curved surface consistent with the disclosed embodiments.

In certain embodiments, a curved LC optical film comprising a plurality of stacked liquid crystal polymer films may operate as an LC linear reflective polarizer which reflects received light of a first linear polarization and transmits received light of a second linear polarization. For example, as shown in FIG. 3C, the LC linear reflective polarizer may be realized by alternating first- and second-type liquid crystal polymer films in the z-axis, in which each first-type liquid crystal polymer film may be fabricated to have an extraordinary refractive index along a first axis (e.g., x-axis) and an ordinary refractive index along a second axis (e.g., y-axis), and each second-type liquid crystal polymer film may be fabricated to have an ordinary refractive index along the first axis (e.g., x-axis) and an ordinary refractive index along the second axis (e.g., y-axis).

The first-type liquid crystal polymer film may be orientated relative to the second-type liquid crystal polymer film to result in the refractive index alternating from extraordinary to ordinary along the first axis (e.g., y-axis), while remaining an ordinary refractive index along the second axis (e.g., y-axis). Accordingly, light polarized along the first axis (e.g., x-axis) may be reflected while light polarized along the second axis (e.g., y-axis) may be transmitted by the LC linear reflective polarizer. In addition, the thickness of each liquid crystal polymer film may be configured for maximum reflection for light polarized along the first axis (e.g., y-axis) and maximum transmission for light polarized along the second axis (e.g., y-axis).

It should be noted that these curved LC optical films with the predetermined optical functions are described merely for illustrative purposes, and curved LC optical films having other optical functions may also be generated using the fabrication method provided in the present disclosure.

Figure 4A:
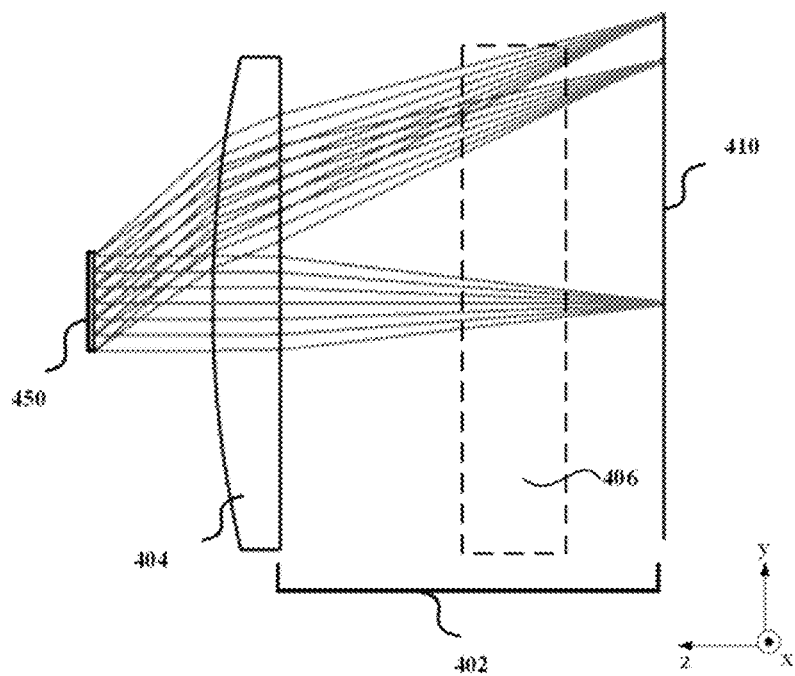
FIG. 4A illustrates a ray-tracing diagram of a lens system focusing light from a display to an eye-box in a head-mounted display (HMD)

FIG. 4A illustrates a ray-tracing diagram of a lens system 404 focusing light from a display 410 to an eye-box 430 in an HMD. As shown in FIG. 4A, in the HMD, light emitted from the display 410 is transmitted to the lens system 404, which magnifies the display 410 by focusing light from the display 410 to the eye-box 430. The lens system 404 comprises one or more lenses. The lens system 404 is separated from the display 410 by a back focal distance (BFD) 402. The HMD is worn by a user so that an eye of the user is positioned at the eye-box 430.

The lens system 404 often uses Fresnel or smooth lenses because of ease of manufacturing. A compromise between image quality and device weight sometimes leads to the lens system 404 with few elements that collectively have a relatively long focal length and, thus, a relatively long back focal distance 402. The back focal distance 402 is often full of air, which significantly increases a volume and/or bulkiness of an HMD (e.g., for use as a VR headset).

In view of this, a pancake lens or a pancake lens block 406 has been used to fold the optical path, thereby reducing the back focal distance in the HMDs. A pancake lens block often includes a partial reflector, a quarter-wave plate and a reflective polarizer which are arranged in optical series to direct the light emitted from the display 410 to the eye-box 430. To produce large a FOV, optical elements in the pancake lens block often require high optical curvature. However, traditional waveplates are often flat, and using such waveplates on the optical elements of high curvature in the pancake lens block is rather difficult due to challenges of laminating a flat film on a curved surface. Thus, the design freedom of existing pancake lens blocks is rather limited.

Figure 4B:
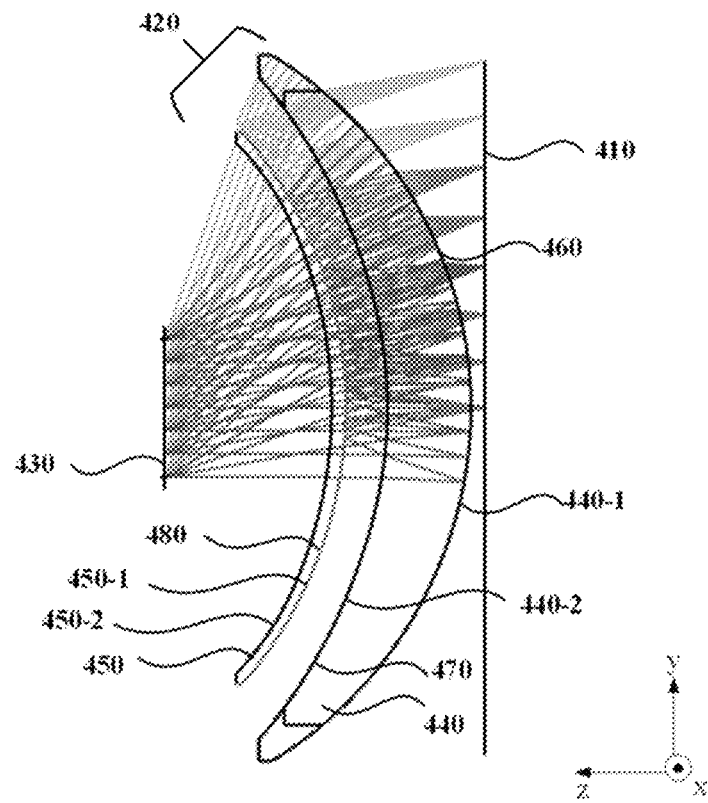
FIG. 4B illustrates a ray tracing diagram of an example pancake lens block focusing light from a display to an eye-box in an HMD consistent with the disclosed embodiments.

The disclosed method of fabricating LC optical films on a curved surface and the fabricated LC optical films thereof may provide a new degree of freedom in pancake lens design in AR/VR/MR HMDs, through which large FOV and compact pancake lenses may be realized. Accordingly, complex imaging functions may be facilitated, and a small form factor, a large FOV, and/or a large eye-box may be achieved in AR/VR/MR HMDs FIG. 4B illustrates a ray tracing diagram of an example of a pancake lens block 420 focusing light from a display 410 to an eye-box 430 in an HMD consistent with the disclosed embodiments. As shown in FIG. 4B, the HMD may comprise a display 410 and a pancake lens block 420. The display 410 may be an electronic display configured to generate image light, and the image light emitted from the display 410 may be transmitted to the eye-box 430. The pancake lens block 420 may include a back optical element 440 that alters the image light, and a front optical element 450 coupled to the back curved optical element 440 to further alter the image light.

The pancake lens block 420 may replace the lens system 404 in FIG. 4A by using curved surfaces for the front optical element 450 and the back optical element 440. The pancake lens block 420 may provide a majority of focal power or all the focal power of the system. One or more surfaces of the front optical element 450 and the back optical element 440 may be shaped to correct for field curvature. For example, one or more surfaces of the front optical element 450 may be shaped to be spherically concave (e.g., a portion of a sphere), spherically convex, a rotationally symmetric asphere, a freeform shape, or some other shape that mitigates field curvature. In certain embodiments, the shape of one or more surfaces of the front optical element 450 and the back optical element 440 may be designed to additionally correct for other forms of optical aberration. In certain embodiments, one or more of the optical elements within the pancake lens block 420 may have one or more coatings, such as anti-reflective coatings, to reduce ghost images and enhance contrast.

The back optical element 440 may have a first surface 440-1 configured to receive the image light from the display 410 and an opposing second surface 440-2 configured to output altered image light. In certain embodiments, the back optical element 440 may include a mirrored surface 460 and a waveplate surface 470 which are separate layers or coatings that are bonded to or formed on the back optical element 440. The waveplate surface 470 may be bonded to or formed on the second surface 440-2 of the back optical element 440, and the mirrored surface 460 may be bonded to or formed on the first surface 440-1 of the back optical element 440.

The mirrored surface 460 may be partially reflective to reflect a portion of the received light. In certain embodiments, the mirrored surface 460 may be configured to transmit 50% of incident light and reflect 50% of incident light. In certain embodiments, the waveplate surface 470 may be a quarter-waveplate that alters the polarization of received light. A quarter-waveplate includes a polarization axis, and the e polarization axis of the waveplate surface 470 may be oriented relative to incident linearly polarized light to convert linearly polarized light into circularly polarized light or vice versa.

The front optical element 450 may include a reflective polarizer surface 480. The reflective polarizer surface 480 may be a layer or a coating that is bonded to or formed on the front optical element 450. The front optical element 450 may have a first surface 450-1 facing the back optical element 440 and an opposing second surface 450-2 far away from the back optical element 440. The reflective polarizer surface 480 may be bonded to or formed on the first surface 450-1 or the second surface 450-2 of the front optical element 450. In one embodiment, as shown in FIG. 4B, the reflective polarizer surface 480 may be bonded to or formed on the first surface 450-1 of the front optical element 450.

The reflective polarizer surface 480 may be a partially reflective mirror configured to reflect received light of a first linear polarization and transmit received light of a second linear polarization, i.e., a linear reflective polarizer. For example, the reflective polarizer surface 480 may be configured to reflect light that is linearly polarized in the x-direction and transmit light that is linearly polarized in the y-direction. That is, the reflective polarizer surface 480 may reflect light that is polarized in a blocking direction (e.g., x-direction) and transmit light that is polarized in a perpendicular direction (e.g., y-direction).

In particular, at least one curved surface of the back curved optical element 440 and the front curved optical element 450 may be attached with an LC optical film fabricated on a curved surface by the disclosed method. In certain embodiments, the waveplate surface 470 and/or the reflective polarizer surface 480 may be an LC optical film fabricated on a curved surface by the disclosed method. For example, the waveplate surface 470 may be an LC quarter-waveplate, and/or the reflective polarizer surface 480 may be an LC linear reflective polarizer. For the waveplate surface 470 (i.e., LC quarter-waveplate), referring to FIG. 1 and FIG. 4B, the back optical element 440 may be the substrate 110 having a curved surface, and the second surface 440-2 of the back optical element 440 may be the curved surface where the waveplate surface 470 is fabricated.

That is, the waveplate surface 470 may be obtained by dispensing a PAM layer on the second surface 440-2 of the back optical element 440, exposing the PAM layer to spatially-uniformly polarized light, dispensing a birefringent material layer on the spatially uniformly aligned PAM layer, aligning the birefringent material molecules by the spatially uniformly aligned PAM layer to create a waveplate structure of a quarter-wave birefringence, and curing the birefringent material layer to stabilize the waveplate structure on the second surface 440-2 of the back optical element 440. Further, the waveplate surface 470 may also be made achromatic by using the method disclosed in FIGS. 3A-3B, and the details are not repeated here.

For the reflective polarizer surface 480 (i.e., LC linear reflective polarizer), referring to FIG. 1 and FIG. 4B, the front optical element 450 may be the substrate 110 having a curved surface, and the first surface 450-1 of the front optical element 450 may be the curved surface where the reflective polarizer surface 480 is fabricated. In certain embodiments, the reflective polarizer surface 480 may be an LC linear reflective polarizer having optic axis orientations shown in FIG. 3C.

That is, the reflective polarizer surface 480 may be realized by alternately fabricating first- and second-type liquid crystal polymer films on the first surface 450-1 of the front optical element 450 along the z-axis. The first-type liquid crystal polymer film may be orientated relative to the second-type liquid crystal polymer film to result in the refractive index alternating from extraordinary to ordinary along the x-axis while remaining an ordinary refractive index along the y-axis. Thus, the reflective polarizer surface 480 may reflect light polarized along the x-axis and transmitting light polarized along the y-axis.

Retuning to FIG. 4B, light from the display 410 may be first transmitted to the mirrored surface 460. A first portion of the light may be reflected by the mirrored surface 460, and a second portion of the light may be transmitted through the mirrored surface 460 and the waveplate surface 470 towards the reflective polarizer surface 480. In certain embodiments, the mirrored surface 460 may be a 50/50 mirror and, thus, 50% of the light emitted from the display 410 may be transmitted through the mirrored surface 460 towards the waveplate surface 470, and 50% of the light may be reflected by the mirrored surface 460.

The light incident onto the reflective polarizer surface 480 may be linearly polarized in the blocking direction and, thus, reflected by the reflective polarizer surface 480. The reflected light may be transmitted through the waveplate surface 470 towards the mirrored surface 460, reflected by the mirrored surface 460 towards the waveplate surface 470, and then transmitted through the reflective polarizer surface 480 because the light has changed the polarization through reflections and/or transmitting through the waveplate surface 470 and the mirrored surface 460. The light transmitted through the reflective polarizer surface 480 may be focused to the eye-box 430.

Because of a double bounce in the pancake lens block 420, the back focal distance in FIG. 4B may be reduced to ⅓ of the back focal distance 404 in FIG. 4A. Meanwhile, through configuring the waveplate surface 470 and/or the reflective polarizer surface 480 as the LC optical film fabricated on a curved surface by the disclosed method, e.g., a curved surface of the back optical element 460 or the front optical element 450 in the pancake lens block 420, the challenges of laminating a flat film on a curved surface may be overcome. Accordingly, the compactness and the FOV of the pancake lens block 420 may be improved.

Figure 4C:
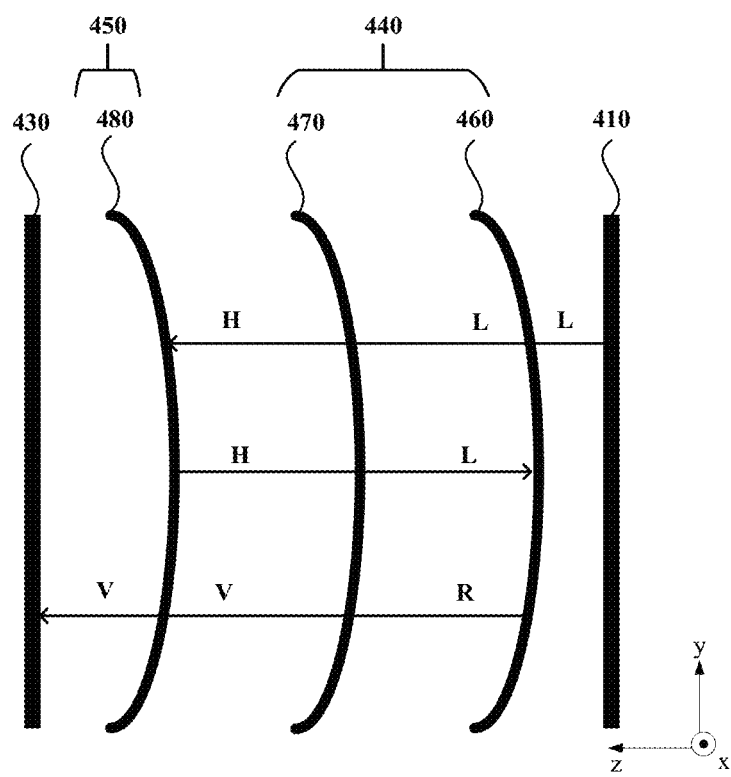
FIG. 4C illustrates a schematic of an example optical path of the pancake lens block in FIG. 4B consistent with the disclosed embodiments.

FIG. 4C illustrates a schematic of an example of an optical path of the pancake lens block in FIG. 4B consistent with the disclosed embodiments. In FIG. 4C, V denotes linearly vertical-polarized light, H denotes linearly horizontal-polarized light, R denotes right-handed circularly polarized light, and L denotes left-handed circularly polarized light. Here linearly vertical-polarized light (V) has an electric field direction parallel to the plane of incidence on a device, and linearly horizontal-polarized light (H) has the electric field oriented perpendicular to that plane.

In one embodiment, as shown in FIG. 4C, light emitted from the display 410 may be left-handed circularly polarized light (L) and transmitted to the mirrored surface 460. A portion of light emitted from the display 410 may be transmitted through the mirrored surface 460. The light transmitted through the mirrored surface 460 may be remained as the left-handed circularly polarized light (L), and transmitted through the back optical element 440 towards the waveplate surface 470. The waveplate surface 470 may convert the left-handed circularly polarized light to linearly horizontal-polarized light (H).

The reflective polarizer surface 480 may transmit linearly vertical-polarized light (V) and reflect linearly horizontal-polarized light (H). Thus, the linear vertical-polarized light (V) traveling in the positive z-direction from the waveplate surface 470 may be reflected by the reflective polarizer surface 480 to be linearly horizontal-polarized light (H) traveling in the negative z-direction. The reflected linearly horizontal-polarized light (H) may be transmitted through the waveplate surface 470 for a second time and converted to left-handed circularly polarized light (L) traveling in the negative z-direction. The left-handed circularly polarized light traveling in the negative z-direction may be reflect by the mirrored surface 460 to be right-handed circularly polarized light (R). The right-handed circularly polarized light (R) may be transmitted through the waveplate surface 470 and converted to be linearly vertical-polarized light (V). Then the linearly vertical-polarized light (V) may be transmitted through the reflective polarizer surface 480 and focused to the eye-box 430.

For illustrative purposes, FIG. 4C shows the light emitted from the display 410 is left-handed circularly polarized light (L). In certain embodiments, light emitted from the display 410 may be linearly polarized light, and a second quarter-waveplate may be arranged between the display 410 and the mirrored surface 460, or bonded to or formed on the mirrored surface 460 to convert the linearly polarized light to circularly polarized light or vice versa. The second quarter-waveplate may also an LC quarter-waveplate fabricated on a curved surface by the disclosed method. In particular, when formed on the mirrored surface 460, the second quarter-waveplate may be fabricated on the first curved surface 440-1 of the back optical element 440 following the formation of the mirrored surface 460.

In the pancake lens block 420 shown in FIG. 4B, the front optical element 450 and the back optical element 440 may be separated by a certain distance where air may be filled, i.e., an air gap. Light propagating through the pancake lens block 420 undergoes multiple reflections between the front optical element 450 and the back optical element 440. When there are air gaps separating front optical element 450 and the back optical element 440, light transmitted through the pancake lens block 420 may have parasitic reflections that reduce the contrast for an image displayed by the display 410. Thus, a monolithic pancake lens block without air gaps between optical elements of the pancake lens block may be highly desired.

In certain embodiments, the first surface 450-1 of the front optical element 450 may be coupled to the second surface 440-2 of the back optical element 440, such that the back optical element 440 and the front optical element 450 may form a monolithic optical element (i.e., a monolithic pancake lens).

Figure 4D:
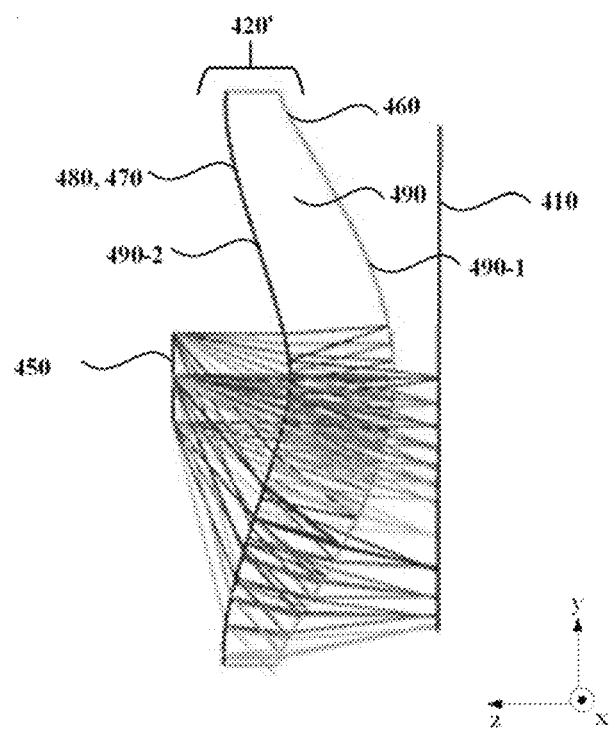
FIG. 4D illustrates a ray tracing diagram of another example pancake lens block focusing light from a display to an eye-box in an HMD consistent with the disclosed embodiments.

FIG. 4D illustrates a ray tracing diagram of another example pancake lens block 420 focusing light from a display 410 to an eye-box 450 in an HMD consistent with the disclosed embodiments. The similarities between FIG. 4B and FIG. 4D are not repeated here, while certain differences are further explained.

As shown in FIG. 4D, the pancake lens block 420' may include a monolithic curved optical element 490. The mirrored surface 460 may be bonded to or formed on a first surface 490-1 of the curved optical element 490. The waveplate surface 470 and the reflective polarizer surface 480 may be sequentially bonded to or formed on a second surface 490-2 of the curved optical element 490, and the waveplate surface 470 and the reflective polarizer surface 480 may be coupled to each other without any air gaps. In particular, the waveplate surface 470 and/or the reflective polarizer surface 480 may be an LC optical film fabricated on a curved surface by the disclosed method. For example, the waveplate surface 470 may be an LC quarter-waveplate, and/or the reflective polarizer surface 480 may be an LC linear reflective polarizer fabricated on the second surface 490-2 of the curved optical element 490 by the disclosed method.

Through sequentially disposing the waveplate surface 470 and the reflective polarizer surface 480 on the second surface 490-2 of the curved optical element 490, the number of active surfaces, or coatings required for the pancake lens block may be reduced, and the compactness of the pancake lens block may be further enhanced. Meanwhile, through removing the air gap between the reflective polarizer surface 480 and the mirrored surface 460, the parasitic reflection and light leakage between the reflective polarizer surface 480 and the mirrored surface 460 may be reduced. Accordingly, the image brightness and image quality observed by the user may be enhanced.

Figure 4E:
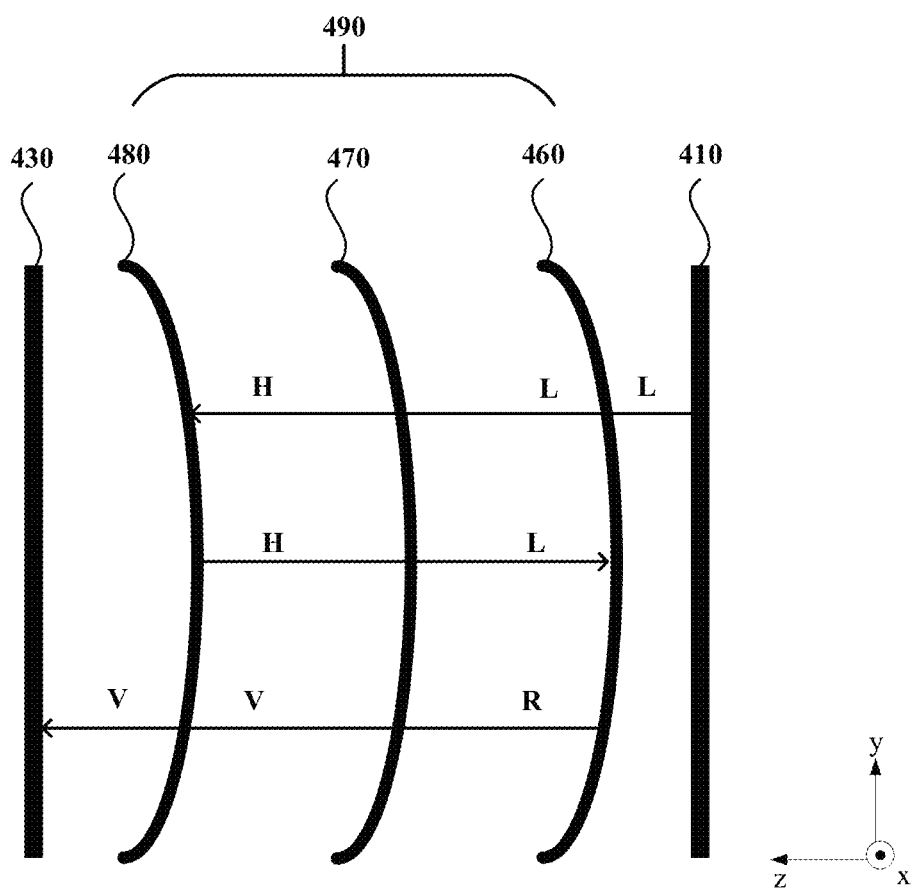
FIG. 4E illustrates a schematic of an example optical path of the pancake lens block in FIG. 4D consistent with the disclosed embodiments.

FIG. 4E illustrates a schematic of an example optical path of the pancake lens block 420' in FIG. 4D consistent with the disclosed embodiments. As shown in FIG. 4F, the optical path of the pancake lens block 420' may be the same as that shown in FIG. 4C, and the details are not repeated here.

For illustrative purposes, FIG. 4B and FIG. 4D show a cross section of the pancake lens block associated with a single eye, but another pancake lens block, separate from the pancake lens block shown in FIG. 4B and FIG. 4D may provide light from an electronic display that is altered by the pancake lens block to another eye of the user. In certain embodiments, the pancake lens block may include components different from those described here. Similarly, functions may be distributed among the components in a manner different from that is described here.

Figure 5:
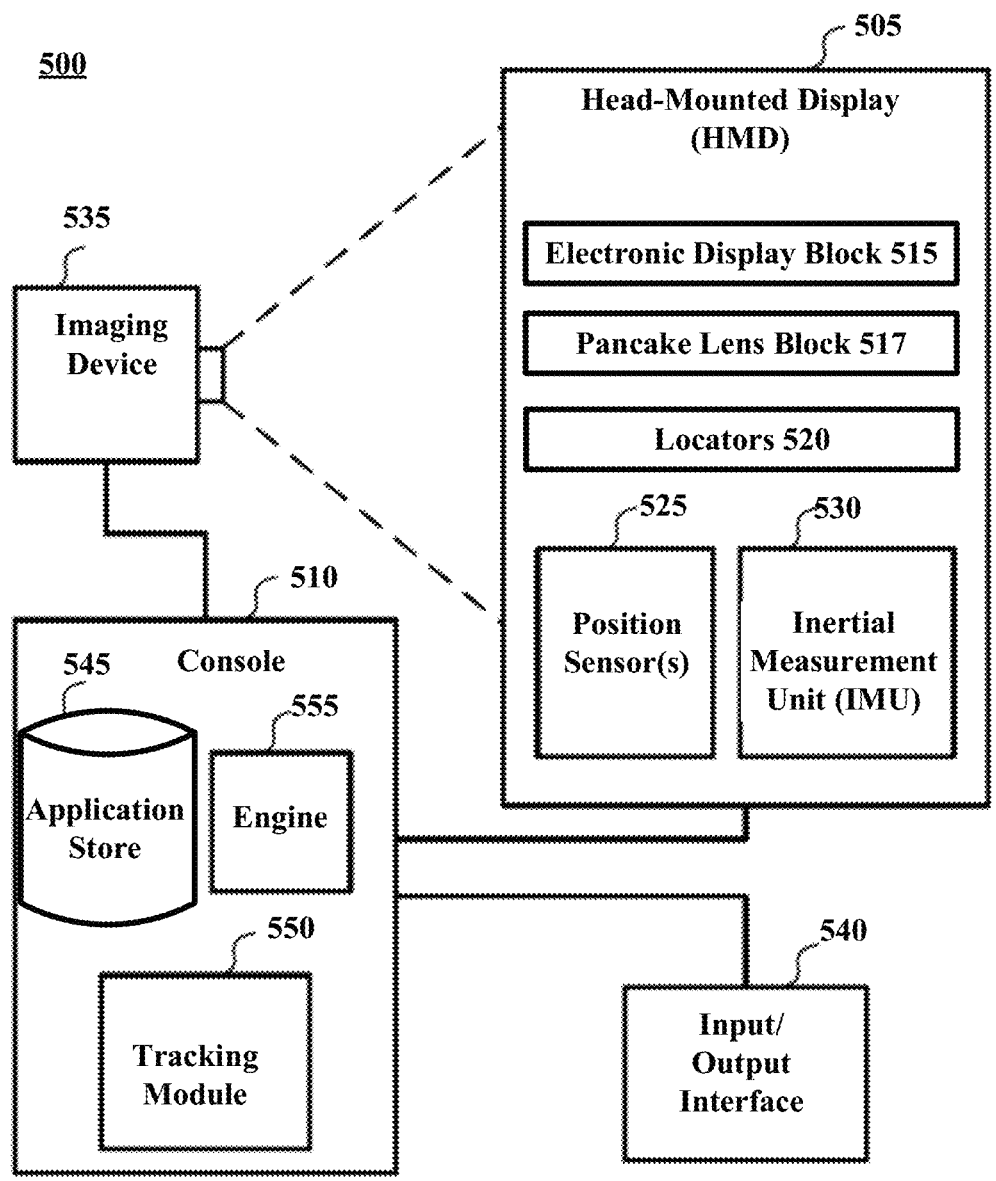
FIG. 5 illustrates an example system environment in which an HMD with a pancake lens operates consistent with the disclosed embodiments.

FIG. 5 illustrates a block diagram of an example system environment 500 comprising an HMD 505 that includes a pancake lens block 517. As shown in FIG. 5, the system environment 500 may comprise the HMD 505, an imaging device 535, and an input interface 540 each of which is coupled to the console 510. Although FIG. 5 shows an example system 500 including one HMD 505, one imaging device 535, and one input interface 540, in certain embodiments, any number of these components may be included in the system environment 500. For example, the system environment 500 may comprise multiple HMDs 505 each having an associated input interface 540 and being monitored by one or more imaging devices 535, and each HMD 505, input interface 540, and imaging device 535 may communicate with the console 510. In certain embodiments, different and/or additional components may be included in the system environment 500. The system environment 500 may operate in a VR system environment, an AR system environment, a MR system environment, or some combination thereof.

The HMD 505 may be a head-mounted display that presents media to a user. Examples of media presented by the HMD include one or more images, video, audio, or some combination thereof. In certain embodiments, audio may be presented via an external device (e.g., speakers and/or headphones) which receives audio information from the HMD 505, the console 510 or both, and presents audio data based on the audio information. An embodiment of the HMD 505 is further described below in conjunction with FIGS. 6A and 6B.

The HMD 505 may comprise one or more rigid bodies, which may be rigidly or non-rigidly coupled to each other together. A rigid coupling between rigid bodies may cause the coupled rigid bodies to act as a single rigid entity. In contrast, a non-rigid coupling between rigid bodies may allow the rigid bodies to move relative to each other. In certain embodiments, the HMD 505 may present VR, AR, MR, or some combination thereof to the user. In the VR, AR and/or MR embodiments, the HMD 505 may augment views of a physical, real-world environment with computer-generated elements (e.g., images, video, sound, etc.).

The HMD 505 may an electronic display block 515, the pancake lens block 517, one or more locators 520, one or more position sensors 525, and an inertial measurement unit (IMU) 530. The electronic display block 515 may display images to the user in accordance with data received from the console 510. In certain embodiments, the electronic display block 515 may include an electronic display and an optics block. The electronic display may generate image light. In various embodiments, the electronic display may comprise a single electronic display or multiple electronic displays (e.g., a display for each eye of a user). Examples of the electronic display may include: a liquid crystal display (LCD), an organic light emitting diode (OLED) display, an active-matrix organic light-emitting diode display (AMOLED), a transparent organic light emitting diode display (TOLED), some other display, a projector, or some combination thereof.

The optics block may include combinations of different optical elements. An optical element may be an aperture, a Fresnel lens, a convex lens, a concave lens, a filter, or any other suitable optical element that affects the image light emitted from the electronic display. In certain embodiments, one or more of the optical elements in the optics block may have one or more coatings, such as anti-reflective coatings. Magnification of the image light by the optics block may allow elements of the electronic display to be physically smaller, weigh less, and consume less power than larger displays. Additionally, magnification may increase a field of view of the displayed media. For example, the field of view of the displayed media is widened, such that the displayed media is presented using almost all (e.g., 110 degrees diagonal), and in some cases all, of the user's field of view. In certain embodiments, the optics block may be designed to have an effective focal length larger than the spacing to the electronic display, thereby magnifying the image light projected by the electronic display. Additionally, in certain embodiments, the amount of magnification may be adjusted by adding or removing optical elements.

The pancake lens block 517 may comprise one or more optical elements including a mirrored surface, a waveplate surface and a reflective polarizer surface that focus image light from the electronic display to the eyes of the user. In particular, the waveplate surface and/or the reflective polarizer surface may be an LC waveplate fabricated on a curved surface by the disclosed method. The pancake lens block 517 may be configured as a monolithic pancake lens block without any air gaps between optical elements of the pancake lens block. The pancake lens block 517 may also magnify received light from the electronic display, correct optical aberrations associated with the image light, and the corrected image light may be presented to a user of the HMD 505.

The locators 520 may be objects located in specific positions on the HMD 505 relative to one another and relative to a specific reference point on the HMD 505. A locator 520 may be a light emitting diode (LED), a corner cube reflector, a reflective marker, a type of light source that contrasts with an environment in which the HMD 505 operates, or some combination thereof. In certain embodiments, when the locators 520 are active (i.e., a LED or other type of light-emitting device) elements, the locators 520 may emit light in the visible band (~380 nm to 550 nm), in the infrared (IR) band (~750 nm to 1 mm), in the ultraviolet band (~10 nm to 380 nm), some other portion of the electromagnetic spectrum, or some combination thereof.

In certain embodiments, the locators 520 may be located beneath an outer surface of the HMD 505, which is transparent to the wavelengths of light emitted or reflected by the locators 520 or is thin enough to not substantially attenuate the wavelengths of light emitted or reflected by the locators 520. Additionally, in certain embodiments, the outer surface or other portions of the HMD 505 may be opaque in the visible band of wavelengths of light. Thus, the locators 520 may emit light in the IR band under an outer surface that is transparent in the IR band but opaque in the visible band.

The IMU 530 may be an electronic device that generates fast calibration data based on measurement signals received from one or more of the position sensors 525. A position sensor 525 may generates one or more measurement signals in response to motion of the HMD 505. Examples of position sensors 525 may include: one or more accelerometers, one or more gyroscopes, one or more magnetometers, another suitable type of sensor that detects motion, a type of sensor used for error correction of the IMU 530, or some combination thereof. The position sensors 525 may be located external to the IMU 530, internal to the IMU 530, or some combination thereof.

Based on the one or more measurement signals from one or more position sensors 525, the IMU 530 may generates fast calibration data indicating an estimated position of the HMD 505 relative to an initial position of the HMD 505. For example, the position sensors 525 may include multiple accelerometers to measure translational motion (forward/back, up/down, left/right) and multiple gyroscopes to measure rotational motion (e.g., pitch, yaw, roll). In certain embodiments, the IMU 530 may rapidly samples the measurement signals and calculates the estimated position of the HMD 505 from the sampled data. For example, the IMU 530 may integrate the measurement signals received from the accelerometers over time to estimate a velocity vector and integrates the velocity vector over time to determine an estimated position of a reference point on the HMD 505. In certain embodiments, the IMU 530 may provide the sampled measurement signals to the console 510, which determines the fast calibration data. The reference point may be a point that may be used to describe the position of the HMD 505. While the reference point may generally be defined as a point in space; however, in practice the reference point may be defined as a point within the HMD 505 (e.g., a center of the IMU 530).

The IMU 530 may receive one or more calibration parameters from the console 510. As further discussed below, the one or more calibration parameters may be used to maintain tracking of the HMD 505. Based on a received calibration parameter, the IMU 530 may adjust one or more IMU parameters (e.g., sample rate). In certain embodiments, certain calibration parameters may cause the IMU 530 to update an initial position of the reference point, so it corresponds to a next calibrated position of the reference point. Updating the initial position of the reference point as the next calibrated position of the reference point may help reduce accumulated error associated with the determined estimated position. The accumulated error, also referred to as drift error, may cause the estimated position of the reference point to "drift" away from the actual position of the reference point over time.

The imaging device 535 may generate slow calibration data in accordance with calibration parameters received from the console 510. Slow calibration data may include one or more images showing observed positions of the locators 520 that are detectable by the imaging device 535. The imaging device 535 may include one or more cameras, one or more video cameras, any other device capable of capturing images including one or more of the locators 520, or some combination thereof. Additionally, the imaging device 535 may include one or more filters (e.g., used to increase signal to noise ratio). The imaging device 535 may be configured to detect light emitted or reflected from locators 520 in a field of view of the imaging device 535.

In certain embodiments, when the locators 520 include passive elements (e.g., a retroreflector), the imaging device 535 may include a light source that illuminates some or all of the locators 520, which retro-reflect the light towards the light source in the imaging device 535. Slow calibration data may be communicated from the imaging device 535 to the console 510, and the imaging device 53 may receive one or more calibration parameters from the console 510 to adjust one or more imaging parameters (e.g., focal length, focus, frame rate, ISO, sensor temperature, shutter speed, aperture, etc.).

The input interface 540 may be a device that allows a user to send action requests to the console 510. An action request is a request to perform a particular action. For example, an action request may be to start or end an application or to perform a particular action within the application. The input interface 540 may include one or more input devices. Example input devices may include: a keyboard, a mouse, a game controller, or any other suitable device for receiving action requests and communicating the received action requests to the console 510. An action request received by the input interface 540 may be communicated to the console 510, which performs an action corresponding to the action request. In certain embodiments, the input interface 540 may provide haptic feedback to the user in accordance with instructions received from the console 510. For example, haptic feedback may be provided when an action request is received, or the console 510 may communicate instructions to the input interface 540 causing the input interface 540 to generate haptic feedback when the console 510 performs an action.

The console 510 may provide media to the HMD 505 for presentation to the user in accordance with information received from one or more of: the imaging device 535, the HMD 505, and the input interface 540. In one embodiment, as shown in FIG. 5, the console 510 may include an application store 545, a tracking module 550, and a virtual reality (VR) engine 555. In certain embodiments, the console 510 may include modules different from those described in conjunction with FIG. 5. Similarly, the functions further described below may be distributed among components of the console 510 in a different manner than is described here.

The application store 545 may store one or more applications for execution by the console 510. An application is a group of instructions, that when executed by a processor, may generate content for presentation to the user. Content generated by an application may be in response to inputs received from the user via movement of the HMD 505 or the input interface 540. Examples of applications may include: gaming applications, conferencing applications, video playback application, or other suitable applications.

The tracking module 550 may calibrate the system 500 using one or more calibration parameters and may adjust one or more calibration parameters to reduce error in determination of the position of the HMD 505. For example, the tracking module 550 may adjust the focus of the imaging device 535 to obtain a more accurate position for observed locators on the HMD 505. Moreover, calibration performed by the tracking module 550 may also account for information received from the IMU 530. Additionally, when tracking of the HMD 505 is lost (e.g., the imaging device 535 loses line of sight of at least a threshold number of the locators 520), the tracking module 550 may re-calibrate some or all of the system environment 500.

The tracking module 550 may track movements of the HMD 505 using slow calibration information from the imaging device 535. The tracking module 550 may determine positions of a reference point of the HMD 505 using observed locators from the slow calibration information and a model of the HMD 505. The tracking module 550 may also determine positions of a reference point of the HMD 505 using position information from the fast calibration information. Additionally, in certain embodiments, the tracking module 550 may use portions of the fast calibration information, the slow calibration information, or some combination thereof, to predict a future location of the HMD 505.

The tracking module 550 may provide the estimated or predicted future position of the HMD 505 to the engine 555.

The engine 555 may execute applications within the system environment 500 and receives position information, acceleration information, velocity information, predicted future positions, or some combination thereof of the HMD 505 from the tracking module 550. Based on the received information, the engine 555 may determine content to provide to the HMD 505 for presentation to the user. For example, when the received information indicates that the user has looked to the left, the engine 555 may generate content for the HMD 505 that mirrors the user's movement in a virtual environment. Additionally, the engine 555 may perform an action within an application executing on the console 510 in response to an action request received from the input interface 540, and provide feedback to the user that the action was performed. The provided feedback may be visual or audible feedback via the HMD 505 or haptic feedback via the input interface 540.

Figure 6A:
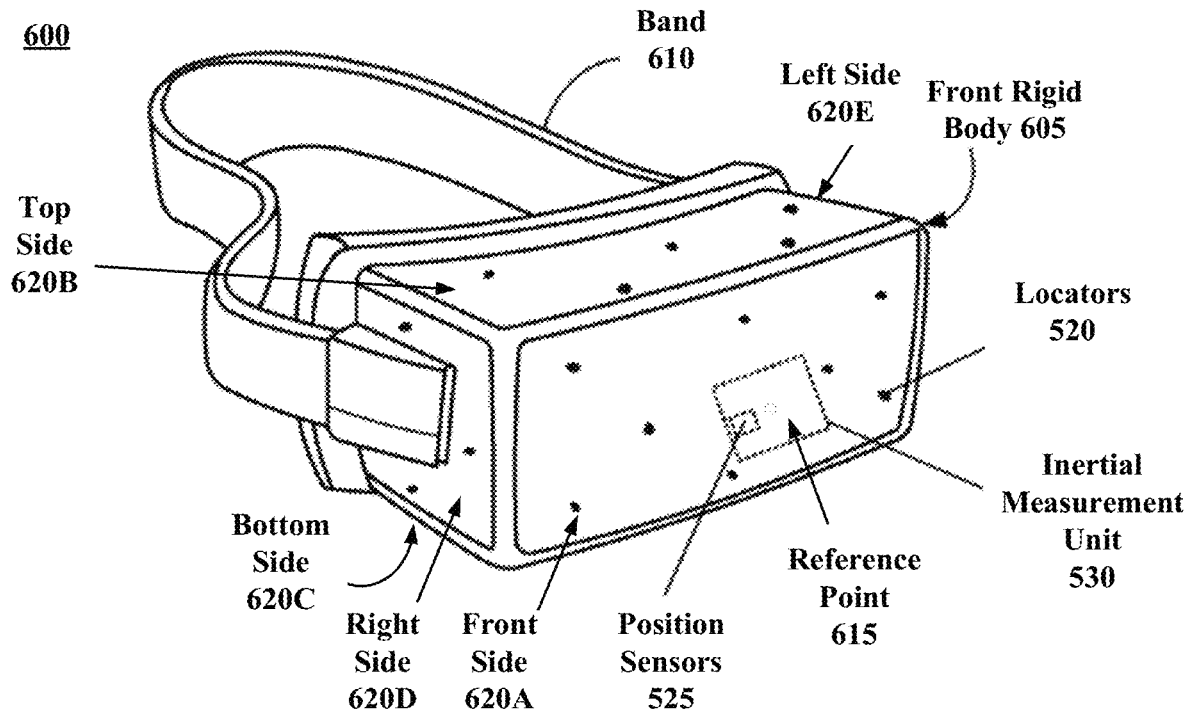
FIG. 6A illustrates a diagram of an example HMD consistent with the disclosed embodiments.

FIG. 6A illustrates a diagram of the HMD 605 in FIG. 5. Referring to FIG. 6A and FIG. 5, the HMD 605 may include a front rigid body 605 and a band 610. The front rigid body 605 may include one or more electronic display elements of the electronic display 628 and optics block (not shown in FIG. 6A), the IMU 530, the one or more position sensors 525, and the locators 520. In the embodiment shown in FIG. 6A, the position sensors 525 may be located within the IMU 530, and neither the IMU 530 nor the position sensors 525 may be visible to the user.

The locators 520 may be located in fixed positions on the front rigid body 605 relative to one another and relative to a reference point 615. In the embodiment shown in FIG. 6A, the reference point 615 may be located at the center of the IMU 530. Each of the locators 520 may emit light that is detectable by the imaging device 535. The locators 520, or portions of locators 520, may be located on a front side 620A, a top side 620B, a bottom side 620C, a right side 620D, and a left side 620E of the front rigid body 605.

Figure 6B:
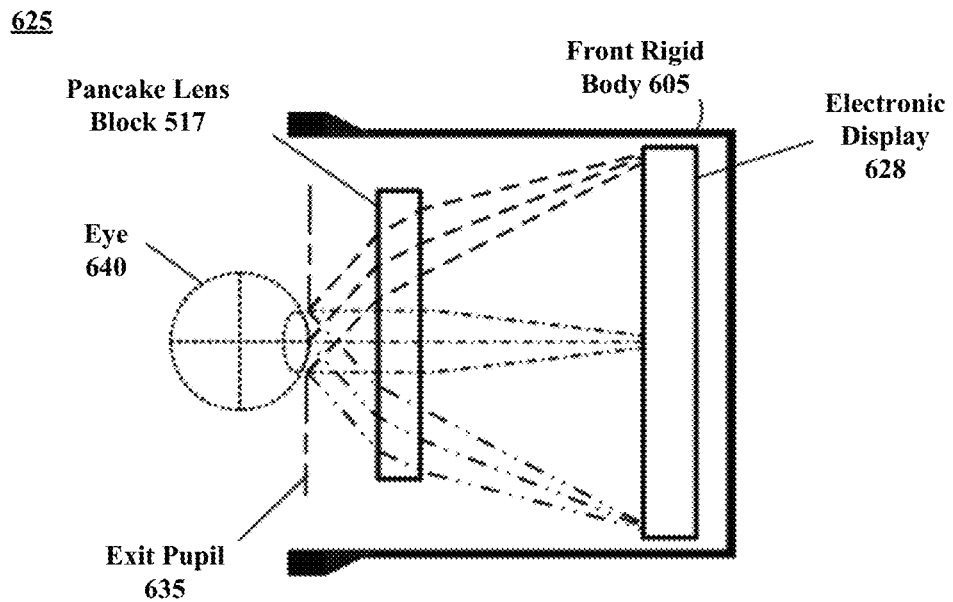
FIG. 6B illustrates a cross section of an example front rigid body of the HMD in FIG. 6A consistent with the disclosed embodiments.

FIG. 6B illustrates a cross-section 625 of the front rigid body 605 of the HMD 505 shown in FIG. 6A. As shown in FIG. 6B, the front rigid body 605 may include the electronic display 628 and the pancake lens block 517 that provides altered image light to an exit pupil 635. The exit pupil 635 may be the location of the front rigid body 605 where a user's eye 640 is positioned. For illustrative purposes of illustration, FIG. 6B shows a cross-section 625 associated with a single eye 640, but another electronic display, separate from the electronic display 628, provides image light altered by the optics block 618 to another eye of the user.

The foregoing description of the embodiments of the disclosure have been presented for the purpose of illustration. It is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method, comprising:
    dispensing a photo-alignment (PAM) layer on a curved surface of a substrate;
    exposing the PAM layer to a linearly polarized light to form a PAM film with photosensitive material molecules in the PAM film being aligned in a substantially same predetermined linear direction;
    dispensing a volume of a birefringent material on the PAM film; and
    curing the volume of the birefringent material to form a birefringent film on the curved surface, birefringent material molecules in the birefringent film being aligned by the PAM film in the substantially same predetermined linear direction within the volume of the birefringent material.

2. The method according to claim 1, wherein:
    the birefringent material includes polymerizable liquid crystal precursors; and
    the birefringent film is a liquid crystal polymer film with orientations of the birefringent material molecules stabilized.

3. The method according to claim 1, wherein exposing the PAM layer to the linearly polarized light further comprises:
    exposing the PAM layer to the linearly polarized light to align the photosensitive material molecules in the PAM film along a polarization direction of the linearly polarized light,
    wherein the linearly polarized light has a wavelength in an absorption band of the PAM layer.

4. The method according to claim 3, further comprising:
    aligning the birefringent material molecules of the birefringent material by the PAM film in which the photosensitive material molecules have been uniformly aligned.

5. The fabrication method according to claim 3, wherein:
    the polarization direction of the linearly polarized light defines the substantially same predetermined linear direction in which the birefringent material molecules are aligned within the volume of the birefringent material.

6. The method according to claim 1, wherein curing the volume of the birefringent material to form the birefringent film on the curved surface further comprises:
    curing the volume of the birefringent material under an unpolarized ultraviolet light to form the birefringent film on the curved surface.

7. The method according to claim 1, wherein:
    the birefringent film formed on the curved surface is configured to operate as one of a waveplate, a phase retarder, or a linear reflective polarizer.

8. The method according to claim 1, wherein:
    the substrate is a lens.

9. The method according to claim 1, wherein the birefringent film is a first birefringent film, the method further comprising:
    forming one or more additional birefringent films on the curved surface of the substrate,
    wherein the one or more additional birefringent films have the same or different optic axis orientations as the first birefringent film.

10. An optical film, comprising:
    a photo-alignment (PAM) film formed on a curved surface of a substrate, photosensitive material molecules in the PAM film being aligned in a substantially same predetermined linear direction; and
    a birefringent film formed over the PAM film on the curved surface of the substrate, the birefringent film including a volume of a birefringent material with birefringent material molecules in the birefringent film aligned by the PAM film in a substantially same predetermined linear direction within the volume of the birefringent material.

11. The optical film according to claim 10, wherein:
    the birefringent film is a liquid crystal polymer film with orientations of the birefringent material molecules stabilized.

12. The optical film according to claim 10, wherein:
    the substrate is a lens.

13. A system, comprising:
    an electronic display configured to generate image light; and
    a pancake lens block comprising:
        a back curved optical element configured to alter the image light, the back curved optical element including a first surface configured to receive the image light and an opposing second surface configured to output an altered image light; and
        a front curved optical element coupled to the back curved optical element, the front curved optical element configured to further alter the altered image light, the front curved optical element including a first surface and a second surface, wherein a first portion of the altered image light is reflected by the first surface of the front curved optical element towards the back curved optical element, wherein the second surface of the back curved optical element is configured to reflect the first portion of the altered image light back to the front curved optical element for transmission to an exit pupil of the system, and an optical film formed on a curved surface of at least one of the back curved optical element or the front curved optical element, the optical film comprising:

a photo-alignment (PAM) film formed on the curved surface of the at least one of the back curved optical element or the front curved optical element, photosensitive material molecules in the PAM film being aligned in a substantially same predetermined linear direction; and a birefringent film formed over the PAM film on the curved surface of the at least one of the back curved optical element or the front curved optical element, the birefringent film including a volume of a birefringent material with birefringent material molecules in the birefringent film aligned by the PAM film in the substantially same predetermined linear direction within the volume of the birefringent material.

14. The system according to claim 13, wherein:
the birefringent film is a liquid crystal polymer film with orientations of the birefringent material molecules stabilized.

15. The system according to claim 13, wherein:
the first surface of the back curved optical element is provided with a mirrored surface configured to partially reflect a portion of the received image light;

the second surface of the back curved optical element is provided with a quarter-waveplate surface configured to convert a linearly polarized light into a circularly polarized light or vice versa; and the first surface or the second surface of the front curved optical element is provided with a reflective polarizer surface configured to reflect a received light of a first linear polarization and transmit a received light of a second linear polarization.

16. The system according to claim 15, wherein:
at least one of the quarter-waveplate surface or the reflective polarizer surface is the optical film.

17. The system according to claim 13, wherein:
the second surface of the back curved optical element is coupled to the first surface of the front curved optical element to form a monolithic curved optical element configured to alter the image light, the monolithic curved optical element is configured to receive the image light and output the altered image light.

18. The system according to claim 17, wherein:
a first surface of the monolithic curved optical element is provided with a mirrored surface configured to partially reflect a portion of the received image light; and a second surface of the monolithic curved optical element is sequentially provided with a quarter-waveplate surface configured to convert a linearly polarized light into a circularly polarized light or vice versa and a reflective polarizer surface configured to reflect a received light of a first linear polarization and transmit a received light of a second linear polarization.

19. The system according to claim 18, wherein:
at least one of the quarter-waveplate surface or the reflective polarizer surface is the optical film.

\* \* \* \* \*